(12) United States Patent
Wigren et al.

(10) Patent No.: US 11,362,713 B2
(45) Date of Patent: Jun. 14, 2022

(54) CONTROLLING TRANSMITTER OUTPUT

(71) Applicant: Telefonaktiebolaget LM Ericsson (publ), Stockholm (SE)

(72) Inventors: Torbjörn Wigren, Uppsala (SE); Svante Bergman, Hägersten (SE); George Jöngren, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/043,620

(22) PCT Filed: Mar. 21, 2019

(86) PCT No.: PCT/SE2019/050252
§ 371 (c)(1),
(2) Date: Sep. 29, 2020

(87) PCT Pub. No.: WO2019/194719
PCT Pub. Date: Oct. 10, 2019

(65) Prior Publication Data
US 2021/0021313 A1    Jan. 21, 2021

Related U.S. Application Data

(60) Provisional application No. 62/654,275, filed on Apr. 6, 2018.

(51) Int. Cl.
*H04B 7/06* (2006.01)
*H04B 1/3827* (2015.01)

(52) U.S. Cl.
CPC ......... *H04B 7/0617* (2013.01); *H04B 7/0695* (2013.01); *H04B 1/3838* (2013.01)

(58) Field of Classification Search
CPC ... H04B 1/3838; H04B 7/0617; H04B 7/0695
See application file for complete search history.

(56) References Cited

U.S. PATENT DOCUMENTS

2013/0163544 A1   6/2013  Lee et al.
2013/0252658 A1*  9/2013  Wilson ................ H04W 52/228
                                                        455/522
(Continued)

FOREIGN PATENT DOCUMENTS

WO    2016/072815 A1    5/2016
WO    2018/056876 A1    3/2018

OTHER PUBLICATIONS

IEEE 802.11-2016, "Part 11: Wireless LAN Medium Access Control (MAC) and Physical Layer (PHY) Specifications," Standard, Institute of Electrical and Electronics Engineers, Inc. (IEEE), Dec. 7, 2016, 3534 pages.

(Continued)

*Primary Examiner* — David B Lugo
(74) *Attorney, Agent, or Firm* — NDWE LLP

(57) ABSTRACT

Methods, apparatus and computer programs are disclosed for controlling the output of a transmission point for a wireless communications network. One embodiment provides a method for controlling the output of a transmission point for a wireless communications network. The method comprises determining an average output power of the transmission point over a period of time; comparing the average output power to an output power reference value; and allocating data, to be transmitted by the transmission point to one or more wireless devices, to a pool of radio resources. The pool of radio resources is adjusted as a function of the comparison between the average output power and the output power reference value, and the output power reference value varies as a function of a maximum antenna gain of an antenna array of the transmission point during the period of time.

21 Claims, 7 Drawing Sheets

(56) References Cited

U.S. PATENT DOCUMENTS

| | | | |
|---|---|---|---|
| 2016/0254889 A1* | 9/2016 | Shattil | H04B 7/0697 |
| | | | 370/329 |
| 2019/0200365 A1* | 6/2019 | Sampath | H04B 1/3838 |
| 2020/0371146 A1* | 11/2020 | Hochwald | G01R 29/0835 |

OTHER PUBLICATIONS

International Search Report and Written Opinion, PCT App. No. PCT/SE2019/050252, dated May 14, 2019, 12 pages.

* cited by examiner

CONTROLLING TRANSMITTER OUTPUT

CROSS-REFERENCE TO RELATED APPLICATIONS

This application is a national stage of International Application No. PCT/SE2019/050252, filed Mar. 21, 2019, which claims the benefit of U.S. Provisional Application No. 62/654,275, filed Apr. 6, 2018, which are hereby incorporated by reference.

TECHNICAL FIELD

Embodiments of the present disclosure relate to wireless communication, and particularly relate to methods, apparatus and computer programs for controlling the output of a transmission point.

BACKGROUND

When any radio equipment is to be deployed, regulatory radio frequency (RF) exposure regulations need to be accounted for. These exposure limitations are typically based on the guidelines from the International Commission on Non-Ionizing Radiation Protection (ICNIRP) but may take different forms in different countries and regions. The aim of the RF exposure regulations is to ensure that human exposure to RF energy is kept within safe limits, which have typically been set with wide safety margins.

Transmission points for wireless communication networks are increasingly being equipped with advanced antenna systems (AAS). These antenna systems increase the capacity and/or coverage of existing wireless systems by addition of an antenna array. This enables the simultaneous transmission of parallel data streams between a base station and a user, so called multiple-input-multiple-output (MIMO) transmission. In some cases, like when millimeter—wave (mmVV) carrier frequencies are used, the main desired effect is rather to enhance coverage by exploiting the high beamforming gain of the new AAS systems.

A consequence of the increasing beamforming gain is that the radiated energy is concentrated in beams, in which the effective radiated power is increased as compared to the situation without AAS systems. The RF exposure limits are typically expressed in terms of power density (W/m$^2$) which in the far field is proportional to the effective isotropic radiated power (EIRP), i.e. the power radiated from an antenna with unity antenna gain in all directions. Consequently, the EIRP can be used to determine the power density in the far field. This implies that at a given distance from the antenna, and in the far field, the experienced momentary EIRP and power density will be higher in a beam generated by an AAS system with beam forming gain, than without such an AAS system.

The ICNIRP and other RF exposure limitations are usually expressed as an average power density over a specified time interval T. This means that the momentary or instantaneous power density can be higher than the specified limit, but the sustained power density must be below the limit. It will further be understood that the power density decays with distance from the transmitter. The distance from the transmitter at which the specified limit is met is referred to as the "compliance distance". To maintain a certain RF exposure compliance distance, which is shorter than that obtained using the maximum momentary EIRP of the AAS, the time-averaged power needs to be maintained at or below a pre-determined threshold.

SUMMARY

The present disclosure provides methods, apparatus and computer programs which seek to mitigate these and other problems.

In one aspect, there is provided a method for controlling the output of a transmission point for a wireless communications network. The method comprises: determining an average output power of the transmission point over a period of time; comparing the average output power to an output power reference value; and allocating data, to be transmitted by the transmission point to one or more wireless devices, to a pool of radio resources. The pool of radio resources is adjusted as a function of the comparison between the average output power and the output power reference value. The output power reference value varies as a function of a maximum antenna gain of an antenna array of the transmission point during the period of time.

In a further aspect, the disclosure provides a network node configured to perform the method recited above.

A further aspect provides a computer program for performing the method recited above. A computer program product, comprising the computer program, is also provided.

Another aspect provides a network node for the output of a transmission point for a wireless communications network, the network node comprising processing circuitry and a non-transitory machine-readable medium storing instructions which, when executed by the processing circuitry, cause the network node to: determine an average output power of the transmission point over a period of time; compare the average output power to an output power reference value; and allocate data, to be transmitted by the transmission point to one or more wireless devices, to a pool of radio resources. The pool of radio resources is adjusted as a function of the comparison between the average output power and the output power reference value. The output power reference value varies as a function of a maximum antenna gain of an antenna array of the transmission point during the period of time.

A further aspect provides a network node for the output of a transmission point for a wireless communications network. The network node comprises: a determining module configured to determine an average output power of the transmission point over a period of time; a comparing module configured to compare the average output power to an output power reference value; and an allocation module configured to allocate data, to be transmitted by the transmission point to one or more wireless devices, to a pool of radio resources. The pool of radio resources is adjusted as a function of the comparison between the average output power and the output power reference value. The output power reference value varies as a function of a maximum antenna gain of an antenna array of the transmission point during the period of time.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
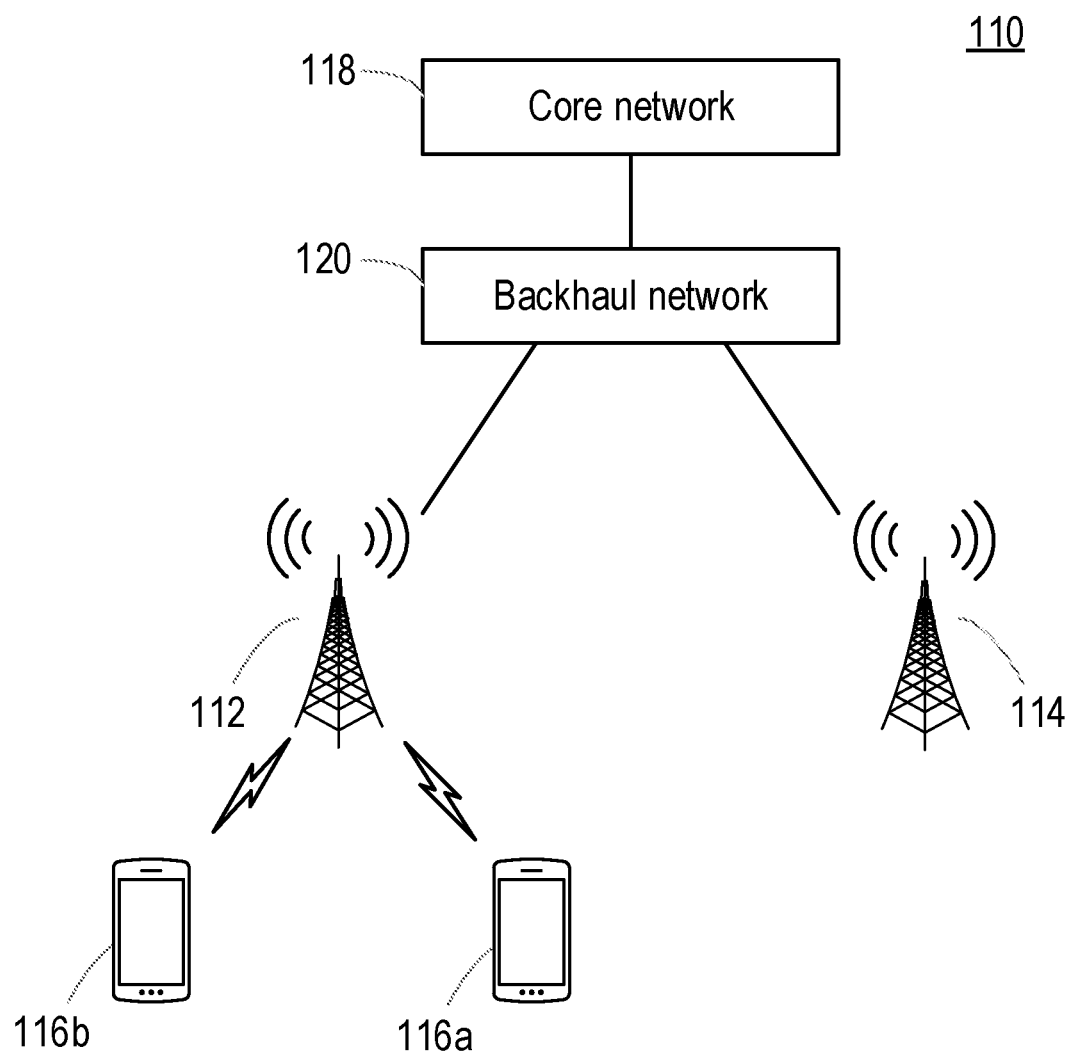
FIG. 1 is a schematic diagram of a wireless communication network according to embodiments of the disclosure.

FIG. 1 shows a communication network 110 according to embodiments of the disclosure.

The network 110 may at least partly be based on radio access technologies such as e.g. 3GPP Long Term Evolution (LTE), LTE-Advanced, Evolved Universal Terrestrial Radio Access Network (E-UTRAN), Universal Mobile Telecommunications Service (UMTS), Global System for Mobile (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some options. The network 110 may be suitable for providing radio communications meeting one or more of the criteria established by the Next Generation Mobile Networks Alliance for the 5th generation of mobile telecommunications standards. In one embodiment, therefore, the communication network 110 may be a wireless cellular network.

The network 110 comprises one or more radio access nodes 112, 114. In the illustrated embodiment, two radio access nodes 112, 114 are shown, but the skilled person will appreciate that any number of radio access nodes may be provided.

The radio access nodes 112, 114 may be referred to as e.g. base stations, NodeBs, evolved NodeBs (eNB, or eNodeB), gNodeBs, base transceiver stations, Access Point Base Stations, base station routers, Radio Base Stations (RBSs), macro base stations, micro base stations, pico base stations, femto base stations, Home eNodeBs, relays and/or repeaters, beacon devices or any other network node configured for communication with wireless devices over a wireless interface, depending e.g. on the radio access technology and terminology used.

The functions of the radio access nodes 112, 114 may be distributed across one or more physical nodes. For example, each radio access node may be divided logically into more than one unit, comprising one or more of the following: a centralized unit (CU), a distributed unit (DU) and a radio unit (RU), remote radio head (RRH) or transmission point (TP).

Each radio access node 112, 114 may serve one or more cells of the network 110. Within each cell, wireless devices communicate with the respective radio access node to provide services to users of the devices as will be familiar to those skilled in the art. Each radio access node 112, 114 further communicates with a core network 118 via a backhaul network 120, in order to co-ordinate and control the network 110, and provide access to other parts of the network 110 (e.g. devices in other cells, not illustrated). In FIG. 1, two wireless devices 116a, 116b (collectively, 116) are shown in communication with radio access node 112.

The wireless devices 116 may also be known as user equipments (UEs), mobile devices, mobile terminal devices, wireless terminal devices, etc.

Those skilled in the art will appreciate that wireless signals are transmitted between the radio access node 112 and the wireless devices 116 using radio resources which are scheduled according to one or more scheduling algorithms. A scheduler may be provided in the radio access node 112 or logically coupled to the radio access node for this purpose. As used herein, "radio resources" refers to any available resource which can be used to transmit wireless signals, such as frequency (e.g. one or more frequency channels or sub-channels), time (e.g. one or more frames, sub-frames, time slots, etc.) or codes (e.g. as used for code-division multiplexing).

Thus, for downlink communications (i.e. from the radio access node 112 to the wireless devices 116), a pool of available radio resources is distributed for transmissions to the wireless devices 116 according to a scheduling algorithm. Various scheduling algorithms are known in the art, and the present disclosure is not limited in that respect. Suitable examples include round robin, fair queuing, proportionally fair scheduling and maximum throughput.

Those skilled in the art will appreciate that the output power of a radio access node varies as a function of the resources it uses for transmissions. For example, when the radio access node is scheduled to transmit using a relatively large amount of resources at any one time (e.g. a relatively large number of frequencies), the output power of that radio access node will also be relatively high; when the radio access node is scheduled to transmit using relatively few resources at any one time (e.g. a relatively low number of frequencies), the output power of that radio access node will be relatively low. Those skilled in the art will further appreciate that the output power of a radio access node can also be controlled through amplification or attenuation of the transmit signals in radio time-frequency resources, or by dynamically adapting the number of power amplifiers used to generate the transmitted signals.

Embodiments of the present disclosure utilize this property to control the output of a transmission point (e.g. a radio access node) of a wireless communications network. In one embodiment, the output of the transmission point is controlled so that a regulatory RF exposure requirement is met.

The radio access node is thus provided with a pool of radio resources with which to schedule transmissions to the wireless devices 116. Embodiments of the disclosure apply limitations to this pool of radio resources so as to limit the output power of the radio access node or transmission point. For example, the radio access node may be permitted to utilize only a fraction of its available pool of radio resources for scheduling transmissions to the wireless devices 116.

Figure 2:
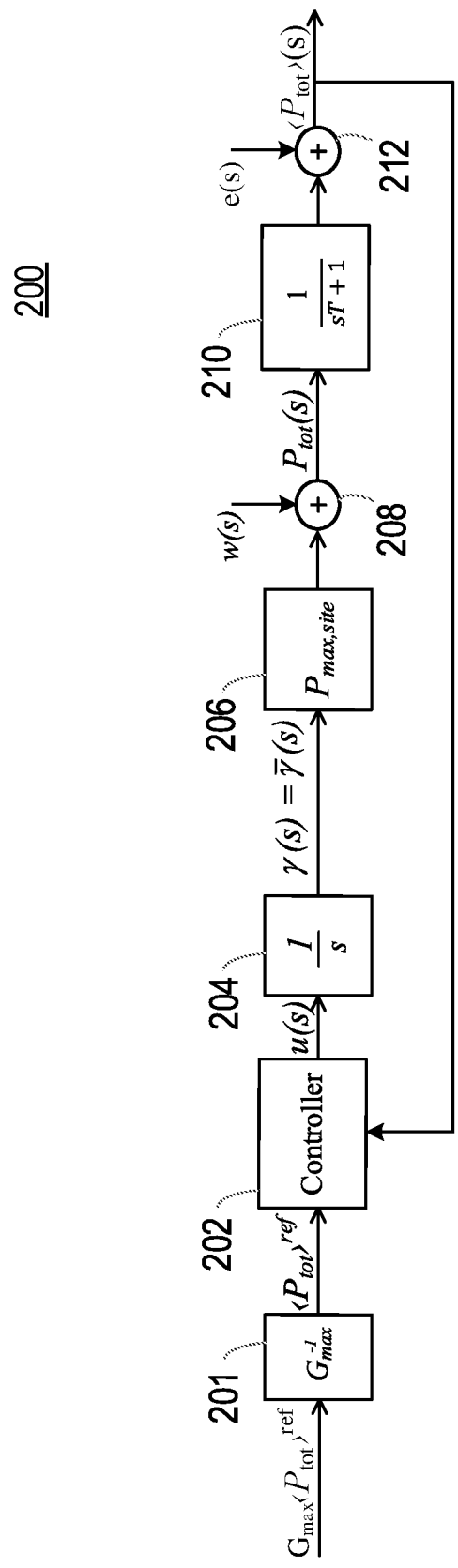
FIG. 2 is a schematic diagram of a feedback control mechanism according to embodiments of the disclosure.

FIG. 2 is a schematic diagram of a feedback control mechanism 200 according to embodiments of the disclosure. The control mechanism 200 may be implemented in a radio access node or transmission point, such as the radio access node 112 described above.

In the illustrated embodiment, the mechanism 200 comprises the following blocks: an antenna gain element 201; a controller 202; an adjuster 204; a transmission power calculator 206; a first adding element 208; an averaging block 210; and a second adding element 212.

The antenna gain element 201 receives an output power reference value $G_{max} \langle P_{tot} \rangle^{ref}$, where $\langle P_{tot} \rangle^{ref}$ is 5 where a nominal reference value and $G_{max}$ is a maximum gain of an antenna array of the radio access node. This output power reference value may be set with reference to a maximum averaged regulatory power $\langle P_{max,regulatory} \rangle$, expressed as an EIRP value, that has been pre-determined to meet a regulatory RF exposure requirement. For example, in one embodiment the output power reference value $G_{max} \langle P_{tot} \rangle^{ref}$ is the maximum averaged regulatory power $\langle P_{max,regulatory} \rangle$; in other embodiments, the output power reference value $G_{max} \langle P_{tot} \rangle^{ref}$ may be set below the maximum averaged regulatory power $\langle P_{max,regulatory} \rangle$. The antenna gain element 201 applies an inverse of the maximum antenna gain $G_{max}$ to recover the nominal reference value $\langle P_{tot} \rangle^{ref}$. The maximum antenna gain may be estimated according to a method described in more detail below. Those skilled in the art will appreciate that there are many ways to mathematically describe the same effective control mechanism disclosed herein. For instance, the entities compared, i.e., 'output power' and 'output power reference' may have other scaling or units and still result in an equivalent control behavior.

The controller 202 receives a feedback signal which is representative of the average output power of the transmission point $\langle P_{tot} \rangle (s)$, as well as the nominal reference value $\langle P_{tot} \rangle^{ref}$. The controller compares the two values and generates a control signal in a manner which will be described in more detail below. In one embodiment, the controller 202 implements a proportional-derivative control scheme when generating the control signal.

In the illustrated embodiment, the control signal u(s) is indicative of a required change in the pool of radio resources. It will be noted here that s is the Laplace transform variable (which is closely related to the angular frequency in Fourier transforms). Thus the control signal commands adjustments to the adjuster, making it increase or decrease. The dynamics of the actuator mechanism is therefore $$\dot{\gamma}(t) = u(t),$$

where γ(t) is the fractional limitation applied to the pool of available radio resources for scheduling, and where u(t) is the control signal discussed further below. t denotes continuous time. Those skilled in the art will appreciate that the control mechanism may alternatively be implemented in discrete time, e.g., using the Euler approximation or the Tustin approximation. The scheduler may then limit the number of radio resources (e.g., frequency resources such as physical resource blocks, PRBs) it uses, or limit any other quantity that correlates well with the momentary output power.

This control signal is provided to the adjuster 204, which integrates the signal to generate a signal γ(t) indicative of the pool of radio resources that may be used for scheduling purposes. This signal may be provided to a limiter (not illustrated), which applies upper and lower limits to the signal γ(t) to generate a limited signal $\bar{\gamma}(t)$.

The maximum value of γ(t) is 1.0 since it expresses a fraction of the total available scheduler resources. In some embodiments, the lower value of γ(t) may also be limited, to prevent the feedback control mechanism from reducing it to an unphysical value below 0.0, or below some lower value $\gamma_{low}$ which prevents correct operation of the transmission point. The following limitation may therefore be applied to the signals:

$$\gamma_{low} \leq \gamma(t) \leq 1.0$$

This limited signal is provided to the transmission power calculator 206, which converts the fractional limitation on the pool of total available radio resources into an output power, based on the maximum total power of the transmission point $P_{max,site}$. It will be seen from the description below with respect to FIGS. 4 and 5 that scheduling of data to the limited pool of radio resources also occurs in this block.

The output power is provided to the first adding element 208 together with a disturbing quantity representative of predicted power errors w(t). The output of the first adding element 208 (which is optional) is thus representative of the instantaneous output power of the transmission point $P_{tot}(s)$. This quantity is then averaged in the averaging block 210 to account for the fact that the regulatory RF exposure requirement is expressed in terms of a time-averaged value. For example, the averaging block 210 may implement the averaging according to any suitable algorithm or model. In the illustrated embodiment, the averaging block 210 implements an autoregressive simplified model of the averaging 1/(sT+1), where T is the averaging time. The output of the averaging block 210 is provided to the second adding element 212, which adds it to a quantity e(s) representative of a measurement error. The output of the second adding element 212 is thus equal to the average total output power of the transmission point $\langle P_{tot} \rangle (s)$. This quantity is fed back to the controller 202 for use as described above.

The signal may further be transmitted from the radio access node, for example using an antenna array comprising a plurality of antenna elements.

As noted above, in some embodiments, the controller 202 may implement a proportional—derivative control scheme. In this case, the control signal generated by the controller 202 may be given by $$u(s) = CT(1+T_D s)(\langle P_{tot} \rangle^{ref} - \langle P_{tot} \rangle(s)).$$

C denotes the proportional gain, and $T_D$ the differentiation time. Following standard procedures of automatic control the poles of the closed loop system of FIG. 2 are given by the following second order equation $$s^2 + (1/T + P_{max,site} KCT_D)s + P_{max,site} KC = 0.$$

These poles govern the closed loop dynamics of the feedback control mechanism, the actuator mechanism, and the averaged power. In order to determine the proportional gain and the differentiation time, a closed loop polynomial with desired poles in $-\alpha_1$ and $-\alpha_2$ is specified as $$s^2 + (\alpha_1 + \alpha_2)s + \alpha_1 \alpha_2 = 0.$$

An identification of coefficients and solution of the resulting system of equations reveal that the proportional gain and differentiation time may be selected as $$C = \frac{\alpha_1 \alpha_2}{KP_{max,site}},$$

$$T_D = \frac{\alpha_1 + \alpha_2 \frac{1}{T}}{\alpha_1 \alpha_2}.$$

Note that C compensates for the gain variation with the direction, while the differentiation time is not dependent on the direction.

A reason for this choice of poles is that a system with two negative real poles can be expected to be well damped, which is a result of a significant differentiation action. This differentiation action is particularly beneficial in providing fast backoff close to the determined threshold, thus preventing inadvertent excessive output power.

To implement the feedback control mechanism, $\langle P_{tot}\rangle^{ref}$, $\langle P_{tot}\rangle(t)$ and $\langle \dot{P}_{tot}\rangle(t)$ may be determined. The first two quantities can be obtained as described above, while the third quantity may be estimated. This can be done, for example, by autoregressive filtering of $\langle P_{tot}\rangle(t)$. One suitable autoregressive filter may be as follows:

$$\langle \dot{P}_{tot}\rangle(s) = \frac{\alpha s}{s+\alpha}\langle P_{tot}\rangle(s).$$

In order to further emphasize the back-off control performance it may be beneficial to allow only differential control action that reduces the scheduler threshold γ(t). Thus in one embodiment, only negative contributions from the second term of the control signal u(s) may be allowed. This means that in the time domain, the following restriction to the derivative $\langle \dot{P}_{tot}\rangle(t)$ may be applied:

$$u(t)=CT(\langle P_{tot}\rangle^{ref} - \langle P_{tot}\rangle(t)) - CTT_D \max(0, \langle \dot{P}_{tot}\rangle(t)).$$

In some embodiments, a hard back-off may be applied selectively to the control signal to prevent inadvertent and momentary overshoot of the maximum averaged regulatory power $\langle P_{max,regulatory}\rangle$. Thus, the fractional limitation applied to the pool of total radio resources may be set to a predetermined value (e.g. its minimum value $\gamma_{low}$) when the following condition is satisfied:

$$\langle P_{tot}\rangle(t) > \text{margin} \cdot \langle P_{max,regulatory}\rangle$$

where margin is a value slightly below 1 and where $\langle P_{max,regulatory}\rangle$ is the maximum averaged regulatory power (which may be the same as or greater than the output power reference value $\langle P_{tot}\rangle^{ref}$).

In further embodiments, the control mechanism illustrated in FIG. 2 and described above may be selectively enabled and disabled based on the average output power of the radio access node or transmission point. For example, when the average output power is relatively low, far from the maximum averaged regulatory power $\langle P_{max,regulatory}\rangle$, the control mechanism may be disabled. Conversely, when the average output power is relatively high, close to the maximum averaged regulatory power, the control mechanism may be enabled to ensure that the average output power remains below the maximum averaged regulatory power $\langle P_{max,regulatory}\rangle$. For example:

The control mechanism may be turned on when $\langle P_{tot}\rangle(t) > \delta_1 P_{max,site}$, and set γ(t)=1.0.

The control mechanism may be turned off when $\langle P_{tot}\rangle(t) < \delta_2 P_{max,site}$.

The values may fulfil the following condition: $\delta_2 P_{max,site} \leq \langle P_{tot}\rangle^{ref} \leq \delta_1 P_{max,site}$.

The feedback control solution described herein may also be applied for multiple optimized gains, per bin, per azimuth restriction set, per elevation restriction set and per azimuth and elevation restriction set. One instance is set out in the description above merely to simplify the notation. Thus multiple, separate feedback control mechanisms may be provided for multiple optimized gains, per bin, per azimuth restriction set, per elevation restriction set and per azimuth and elevation restriction set.

Figure 3:
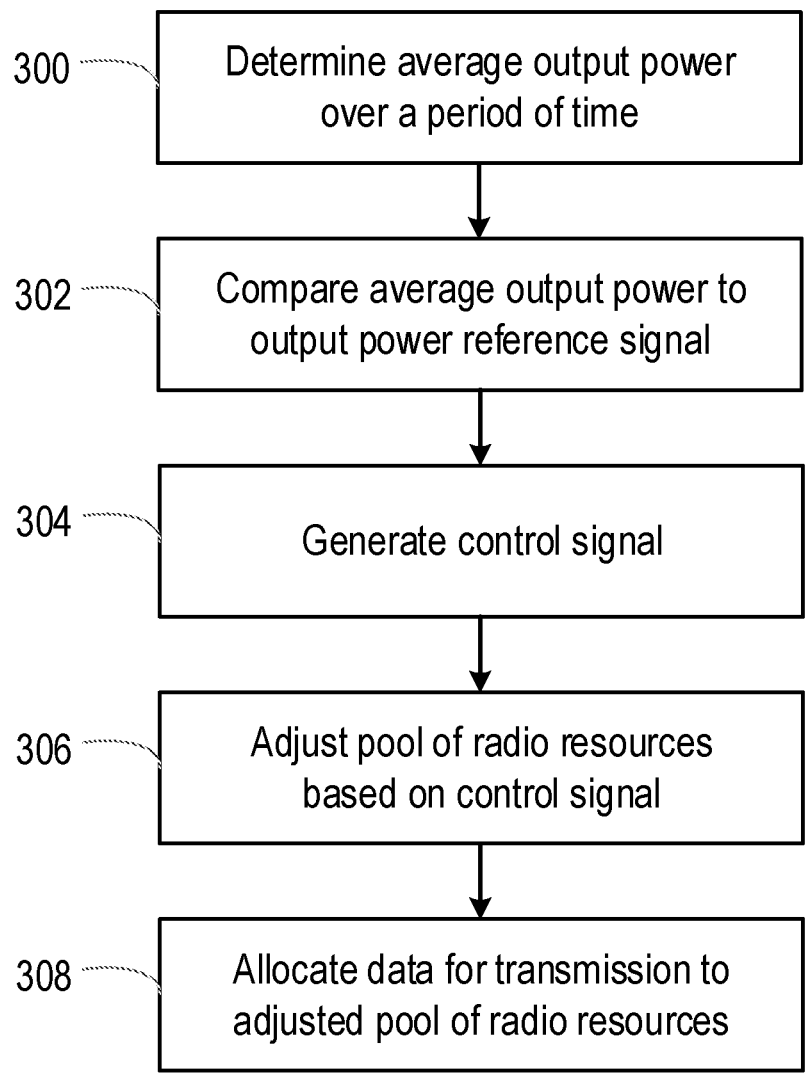
FIG. 3 is a flowchart of a method according to embodiments of the disclosure.

FIG. 3 is a flowchart of a method according to embodiments of the disclosure. The method may be implemented in a network node, such as the radio access node 112 described above. Alternatively, the method may be implemented in a scheduler within or logically coupled to such a radio access node.

The method begins in step 300, in which the average output power of the radio access node over a period of time is determined. The average output power may be determined by measurement, e.g. of radio signals, just prior to transmission via the antenna or antenna array. In one embodiment this can be done by couplers that measure the radio signal amplitude at each signal path to an antenna element. These amplitudes can then be combined into a total output power of the radio, with the antenna gain removed.

Based on such measurements, the averaged power can be constructed by integration as $$\langle P_{tot}\rangle(t) = \frac{1}{T}\int_{t-T}^{t} P_{tot}(\tau)d\tau$$

Here $P_{tot}(t)$ is the total measured power in the radio at current time t and T is the averaging time specified in the regulation. τ is the integration time variable.

Alternatively, the output power of the radio access node may be predicted using information available in the scheduler or elsewhere in base band. For example, the estimated output power may be obtained based on the fraction of radio resources (e.g., PRBs) in use at one time, and then averaging this quantity over a period of time. Thus the momentary scheduled power as estimated by the fraction of PRBs used at each time instant may be summed over the time T, and then divided by the time T to obtain the average.

This approach is however subject to a number of errors. These include e.g. the actual power needed for re-transmissions, signal scaling and quantization errors, as well as errors caused by radio signal processing close to the antenna, including e.g. clipping to achieve peak to average power reductions.

In step 302, the determined average output power is compared to an output power reference value $\langle P_{tot}\rangle^{ref}$. According to embodiments of the disclosure, the output power reference value varies as a function of a maximum power density and/or a maximum antenna gain of the antenna array used by the radio access node to transmit the signals.

The estimate of maximum power density and/or antenna gain is based on a time averaged estimate of the transmit correlation matrix capturing the correlation between radio branches, i.e. signals provided to separate antenna elements of the antenna array. The transmit correlation matrix can be estimated in the digital domain only (e.g. in baseband), or through a hybrid estimate based on baseband measurements and on the de-facto transmit power measurements of the transmit radio signals, for instance in the digital pre-distortion. This means that the power density estimate is combined with a measured total power.

The first component of the transmit correlation matrix estimation is to accumulate spatial correlation between baseband frequency-domain ports. Denote by $R_m(t)$ the spatial correlation matrix at time t, in correlation bin m. A correlation bin is a period of time in which a transmit correlation matrix is accumulated. To create the effect of a windowed time average one can use a vector of multiple correlation bins, where the oldest correlation bin is replaced with a new bin when the latest correlation bin reaches the full bin duration in time. The windowed time average is then the average over all correlation bins in the vector. The correlation matrix within a correlation bin is accumulated over time as follows $$R_m(t) = R_m(t-1) + \sum_{n_{RE} \in N} \beta(n_{RE}) x(n_{RE}, t) x(n_{RE}, t)^H$$

where $x(n_{RE},t)$ is the transmitted frequency-domain signals from the different radio branches at resource element $n_{RE}$, in subframe/slot/TTI index t. This information is available in the base band processing software. The set N is a set of all or a subset of all resource elements in the time interval represented by index t. In the case where not all resource elements are included in the set it is possible to use a weighting $\beta(n_{RE})$ that accounts for relative difference in weight of different resource elements in N. For example, it is not necessary to compute the outer product of all data resource elements (REs) in a resource block because they will most often be the same. Instead a single RE per PRB can be chosen as representative for all REs and then $\beta(n_{RE})$ is the number of REs represented by this single RE. Note also that in the above accumulation the correlation matrix strength grows with the number of samples that has been accumulated in the bin. This is permitted as the matrix will be normalized in later processing.

A slightly different accumulation method is to accumulate a random or pseudo-random subset of the resource elements in time index t. This means that the set N=N(t) changes with respect to time in a randomized manner. Randomized sampling of the resource elements reduces the computational complexity of accumulating the correlation matrix at the cost of slightly longer accumulation time to get sufficient statistical accuracy. In practice the accumulation time should not be a problem as the time scales for power accumulation are typically substantially much longer than the time defined by a time index t.

The correlation accumulation method can also be applied after a beamspace transformation on the baseband vector, x. A beam space transformation that reduces the number of dimensions allows for some degree of compression by omitting or approximating the strength of beam directions considered to be weak.

Clipping and other non-linearities may impact the true transmitted signal compared to the frequency domain baseband correlation matrix. A simple model is to assume that non-linearities create some degree of spatially uncorrelated signal distortion. This distortion can be modeled as an additive diagonal term to the correlation matrix as $$\hat{R}_m(t) = R_m(t) + I\beta$$

where $\beta$ is a coefficient that can be measured or derived analytically. In one embodiment the $\beta$ parameter is determined based on measurements and a-priori information about the non-linearities. It is noted that when feedback from a measured total power is available, the feedback mechanism itself will compensate for errors in absolute transmit power, by an appropriate adjustment of the resource threshold. In this way, distortion attenuation can be provided without the need for modeling. The $\beta$ parameter compensation will simply alter the relative strength between the eigenvalues of the transmit correlation matrix.

In parallel to accumulation of the baseband correlation matrix, it is possible to measure a time domain transmit power in the radio after power amplification. The radio measurement can be used to re-scale or adjust the estimate of transmit correlation matrix obtained in baseband frequency-domain.

The total output power of an antenna array, over all directions, can hence be measured in the radio, for instance digitally in the digital pre-distortion phase, or in analogue-domain before the antenna. In one embodiment this can be done by couplers that measure the radio signal amplitude at each signal path to an antenna element. These amplitudes can then be treated separately into power per radio branch, or combined into a total output power of the radio. The total power $P_{tot,m}(t)$ in a correlation bin can then be accumulated as $$P_{sum,m}(t) = P_{sum,m}(t-1) + P_{instant}(t)$$

$$M_{sampl,m}(t) = M_{sampl,m}(t-1) + 1$$

$$P_{tot,m}(t) = \frac{P_{sum,m}(t)}{M_{sampl,m}(t)}$$

where $P_{tot,m}(t)$ is the accumulated power at time t, and the measurement bin $P_{instant}(t)$ is the instantaneous transmit power in subframe/slot/TTI t, $P_{sum,m}(t)$ and $M_{sampl,m}(t)$ is the sum power and number of samples respectively in the measurement bin. Again, it is possible to randomize the sampling if the accumulation is too computationally demanding.

Based on the accumulated baseband correlation matrix and the accumulated transmit power, a power normalized transmit correlation matrix can be obtained as $$\tilde{R}_m(t) P_{tot,m}(t) = \frac{R_m(t)}{Tr\{R_m(t)\}} P_{tot,m}(t)$$

The power normalized transmit correlation matrix then has the spatial correlation measured in baseband, but the absolute transmit power scaling of the matrix is measured in the radio.

In an alternative embodiment it is possible to measure transmit powers per antenna branch and re-normalize the transmit correlation matrix accordingly, or simply re-normalize the transmit correlation matrix based on precomputed/estimated powers. To describe such an embodiment, define the measured transmit power of antenna branch, k, as $P_m^{(k)}(t)$. Then define the diagonal renormalization matrix, D, as $$[D]_{kk} = \left( \frac{P_m^{(k)}}{[R_m]_{kk} P_{tot,m}} \right)^{1/2}$$

$$\tilde{R}_m = D R_m D$$

where the time index has been omitted for notational simplicity.

If the transmit correlation matrices are binned in different long period time intervals, then longer time averages covering multiple bins can be computed by averaging over the bins as $$\tilde{R}(t) = \frac{\Sigma R_n(t) P_{tot,n}(t)}{\Sigma Tr\{R_n(t)\} P_{tot,n}(t)}$$

Note here that with this notation the trace of the $R_n(t)$ matrix grows linearly with the number of samples in the bin. If the matrix is instead normalized with the number of samples, that would have to be accounted for in the longer time average. Longer time averaged transmit power can be computed as $$P_{tot}(t) = \frac{\Sigma P_{sum,n}(t)}{\Sigma M_{samples,n}(t)}$$

Once the transmit correlation matrix it is possible to obtain an upper bound of the normalized gain by optimizing a steering vector a $$G_{max}(t) = \text{argmax}_{a \in A}(a^H \tilde{R}(t) a).$$

This can be thought of as a maximum or worst case antenna gain to scale the measured power with. The set A defines the set of all relevant steering vectors. The larger the set of all steering vectors, the looser the bound between the true maximum power density to the upper bound $G_{max}(t)$ will be. Below is a list of different steering vector sets with various degrees of tightness.

Spectral radius: The set constitute all steering vectors of unit norm scaled with the maximum subarray gain, G.

$$A = \{a \in R^N : a^H a = G\}$$

The bound will be the spectral norm of the transmit correlation matrix k (t).

Maximum phase vector: The set constitute all steering vectors with equal power per radio, normalized to the maximum subarray gain, G.

$$A = \{a \in R^N : |a_i|^2 = G/N\}$$

The bound can be computed using convex optimization tools, and the bound will be tighter than the spectral norm bound.

Both of the above bounds are not directly impacted by subarray or antenna configuration, hence the need to compensate with the maximum subarray gain, G. Another way to assess the maximum power is to try to approximate the maximum power bound by considering a set A that is based on sampling the sphere with different beam direction vectors. These approximations are not guaranteed to be strict upper bounds unless the sampling is very dense, but the approximation may be tighter compared to above bounds. Furthermore, by allowing distinct vectors with spatial meaning it is also possible to have different weighting of the vectors to ensure tighter requirements in specific directions.

Maximum beam direction: Define the set to sample the sphere with unit norm grid of beams scaled with the square root of the maximum subarray gain.

$$A = \{a \in R^N : 2D \text{ steering vectors dependent on AAS configuration}\}$$

Maximum measured beam direction including antenna gain: Define the set to sample the sphere with grid of beams weighted with the subarray and antenna element patterns.

$$A = \{a \in R^N : \text{weight vectors obtained from lab measurements or antenna model that spans the sphere}\}$$

The optimization problem above determines one worst case steering vector and a corresponding worst case antenna gain. Typically, this optimization would be done for the whole cell. It is however also possible to generalize to multiple optimization problems, e.g. one for each bin. Thus more than one steering vector may be provided.

In a further embodiment, each of the multiple optimizations may be performed over a set of steering vectors that are restricted. The restrictions would typically be defined by sets with:

A restricted extension in azimuth angle.
A restricted extension in elevation angle.
A restriction in azimuth and elevation angles.

A simple, but less accurate alternative than using the measured total power in the radio would be to replace the momentary measured power by a predicted total output power using information available in the scheduler or elsewhere in base band. Such a quantity could be obtained, e.g. by summing up the momentary scheduled power as estimated by the fraction of PRBs used at each time instant, over the time T.

In step 304, a control signal is generated based on the comparison in step 302. The control signal may be generated using a similar mechanism to that described above with respect to FIG. 2. For example, in one embodiment, the control signal is indicative of a change, or a rate of change, to a pool of radio resources available to the scheduler for downlink transmissions to one or more wireless devices.

The control signal may be generated according to a proportional derivative control scheme, which has at least one component which is proportional to the difference between the output power reference value and the average output power, and at least one component which is proportional to the time derivative of the difference between the output power reference value and the average output power.

The radio access node has a total pool of radio resources with which to schedule transmissions to one or more wireless devices (e.g. wireless devices 116 served by the radio access node). In step 306, this pool of radio resources is adjusted based on the control signal. For example, the control signal may be indicative of (or used to calculate) a fraction of the pool of radio resources or a rate of change of the fraction of the pool of radio resources. By applying this fraction to the pool of resources, an adjusted pool of resources is generated which may be reduced in size compared to the total pool of radio resources. Depending on the state of the feedback control scheme, the adjustment to the pool of resources may be positive or negative.

Thus the scheduler is provided with an adjusted pool of resources which is less than the total pool of radio resources which would otherwise be available to it. The adjusted pool of resources may be formulated based on the total pool of radio resources, but with a fraction of the resources removed. For example, the number of frequency resources (e.g. PRBs, sub-channels, etc.) may be reduced by removing a number of resources at higher frequencies, or lower frequencies, or removing frequency resources which are distributed through the bandwidth of the pool of resources (e.g. every nth resource may be removed, where n is an integer).

In step 308, this adjusted pool of radio resources is used to schedule transmissions to one or more wireless devices. Thus data which is available to the radio access node for transmission to the one or more wireless devices is assigned or allocated to resources in the adjusted pool of radio resources. One or more scheduling algorithms may be utilized for this purpose. Various scheduling algorithms are known in the art, and the present disclosure is not limited in that respect. Suitable examples include round robin, fair queuing, proportionally fair scheduling and maximum throughput.

The radio access node may then proceed to transmit wireless signals to the one or more wireless devices according to the scheduled resources. In some embodiments the method shown in FIG. 3 is iterative. Thus, the average output power of the radio access node is again determined (i.e. as described with respect to step 300), and compared to an output power reference value. Thus the method may continue to adjust the pool of radio resources and so adjust the output power of the radio access node.

It will be noted again that the method set out with respect to FIG. 3 may be repeated for multiple optimized gains, per bin, per azimuth restriction set, per elevation restriction set and per azimuth and elevation restriction set.

Figure 4:
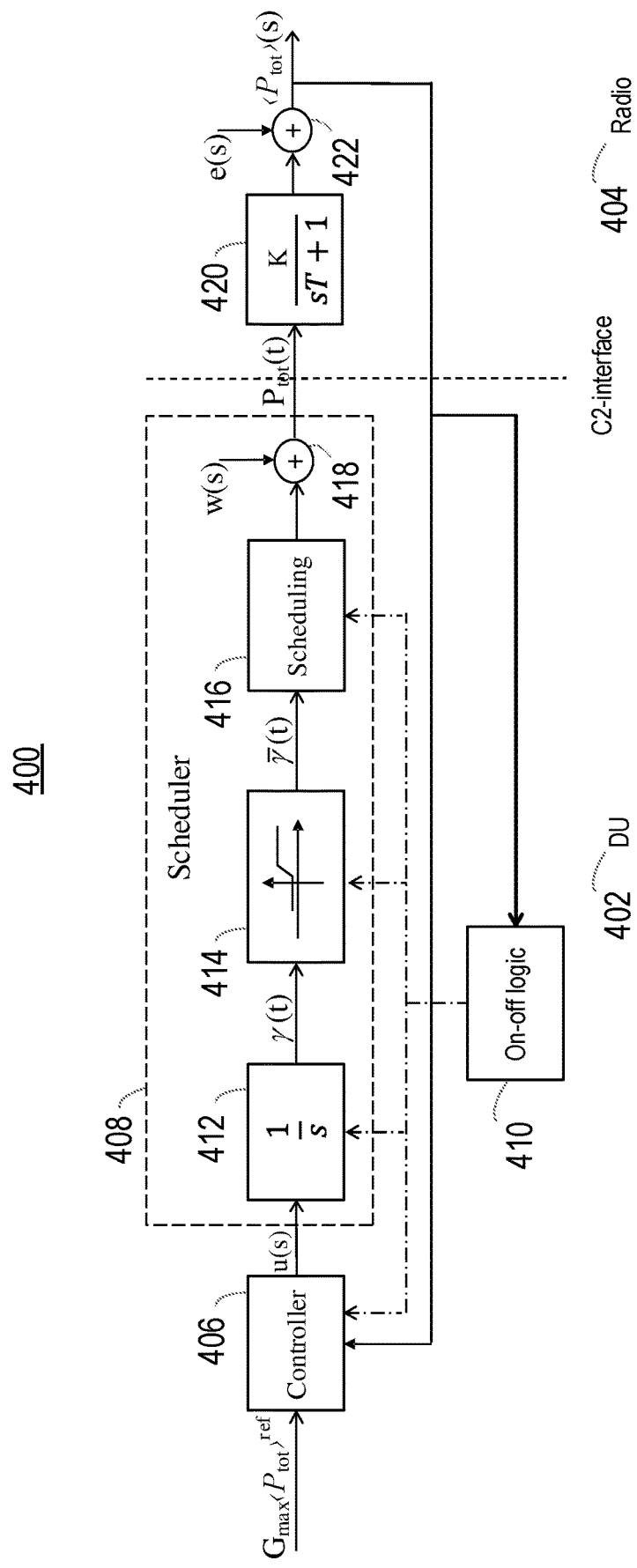
FIG. 4 shows a transmitter arrangement according to embodiments of the disclosure.

FIG. 4 shows a transmitter arrangement 400 according to embodiments of the disclosure.

In the illustrated embodiment, the transmitter arrangement 400 comprises a digital unit (DU) 402 and a radio unit 404, coupled to each other via a suitable interface. In the illustrated embodiment, this interface is termed a C2 interface. The DU 402 comprises a controller 406, a scheduler 408 and on/off logic 410.

It will be seen that the transmitter arrangement 400 implements a control mechanism as illustrated in and described above with respect to FIG. 2. Thus the controller 406 receives a feedback signal which is representative of the average output power of the transmission point $\langle P_{tot} \rangle$(s), as well as an output power reference value $G_{max} \langle P_{tot} \rangle^{ref}$. The controller 406 applies an inverse of the maximum antenna gain $G_{max}$ to recover the value $\langle P_{tot} \rangle$(s), compares the two values and generates a control signal u(s). In one embodiment, the controller 406 implements a proportional—derivative control scheme when generating the control signal. In the illustrated embodiment, the control signal u(s) is indicative of a required change in the pool of radio resources.

The control signal u(s) is provided to the scheduler 408, and is used to adjust a pool of radio resources available to the scheduler 408 for the purposes of scheduling transmissions to one or more wireless devices. Alternatively, the control signal may be used to adjust the rate of change of the pool of radio resources available to the scheduler 408.

In the illustrated embodiment, the control signal is integrated in an integrator 412, which converts the control signal, being indicative of a change (or a rate of change) in the fraction of pool of resources, to a fraction γ(t) of the pool of resources. The fraction γ(t) is then provided to a limiter 414, which applies one or more limitations to the fraction γ(t). For example, the limiter 414 may apply upper and lower limitations to the fraction γ(t), to ensure that the fraction γ(t) falls within upper and lower values. Thus, if the output of the integrator 412 is greater than the upper value, the limiter 414 limits the fraction to the upper value; if the output of the integrator 412 is less than the lower value, the limiter 414 limits the fraction to the lower value.

The output of the limiter 414 thus represents a limited pool of radio resources available to the scheduler 408, Thus only a fraction of the total pool of radio resources becomes available to a scheduling algorithm 416, for the allocation of data for transmission to one or more wireless devices. As noted above, various scheduling algorithms may be utilized, including round robin, fair queuing, proportionally fair scheduling and maximum throughput.

The output of the scheduling algorithm 416 is thus a set of signals to be provided to the radio unit 404, comprising data to be transmitted to one or more wireless devices utilizing resources selected from the adjusted pool of radio resources. In the illustrated model, these signals are adjusted by the addition of a quantity representative of predicted power errors w(t) in a first adding element 418.

The output of the first adding element 418 is thus representative of the instantaneous output power of the transmission point $P_{tot}$(s). This quantity is provided to the radio unit 404, via the C2 interface, in terms of the data that is scheduled for transmission, where it is averaged in an averaging block 420 to account for the fact that the regulatory RF exposure limit is expressed as a time-averaged value which is related to a time-averaged transmission output power. For example, the averaging block 420 may implement the averaging according to any suitable algorithm or model. In the illustrated embodiment, the averaging block 420 implements an autoregressive simplified model of the averaging 1/(sT+1), where T is the averaging time. The output of the averaging block 420 is provided to a second adding element 422, which adds it to a quantity e(s). which is representative of an averaged total power measurement error. The output of the second adding element 422 is thus equal to the average total output power of the transmission point $\langle P_{tot} \rangle$(s). This quantity is fed back to the controller 406 for use as described above.

The signal may further applied to an antenna or an antenna array (not illustrated), which applies an antenna gain G and transmits the signals from the radio access node.

The average total output power of the transmission point $\langle P_{tot} \rangle$(s) is also provided to on/off logic 410, which serves to enable and disable the feedback control mechanism. For this purpose, the on/off logic 410 may have control interfaces with one or more of the controller 406, the integrator 412, the limiter 414 and the scheduling algorithm 416. For example, when the average output power is relatively low, far from the maximum averaged regulatory power $\langle P_{max, regulatory} \rangle$, the control mechanism may be disabled by sending appropriate disabling control signals to one or more of the modules identified above. Conversely, when the average output power is relatively high, close to the maximum averaged regulatory power $\langle P_{max,regulatory} \rangle$, the control mechanism may be enabled by sending appropriate enabling control signals to one or more of the modules identified above, to ensure that the maximum averaged regulatory power $\langle P_{max,regulatory} \rangle$ is not exceeded. For example:

The control mechanism may be turned on when $\langle P_{tot} \rangle (t) > \delta_1 P_{max,site}$, and set γ(t)=1.0.

The control mechanism may be turned off when $\langle P_{tot} \rangle (t) < \delta_2 P_{max,site}$.

The values may fulfil the following condition: $\delta_2 P_{max,site} \leq \langle P_{tot} \rangle^{ref} \leq \delta_1 P_{max,site}$.

Figure 5:
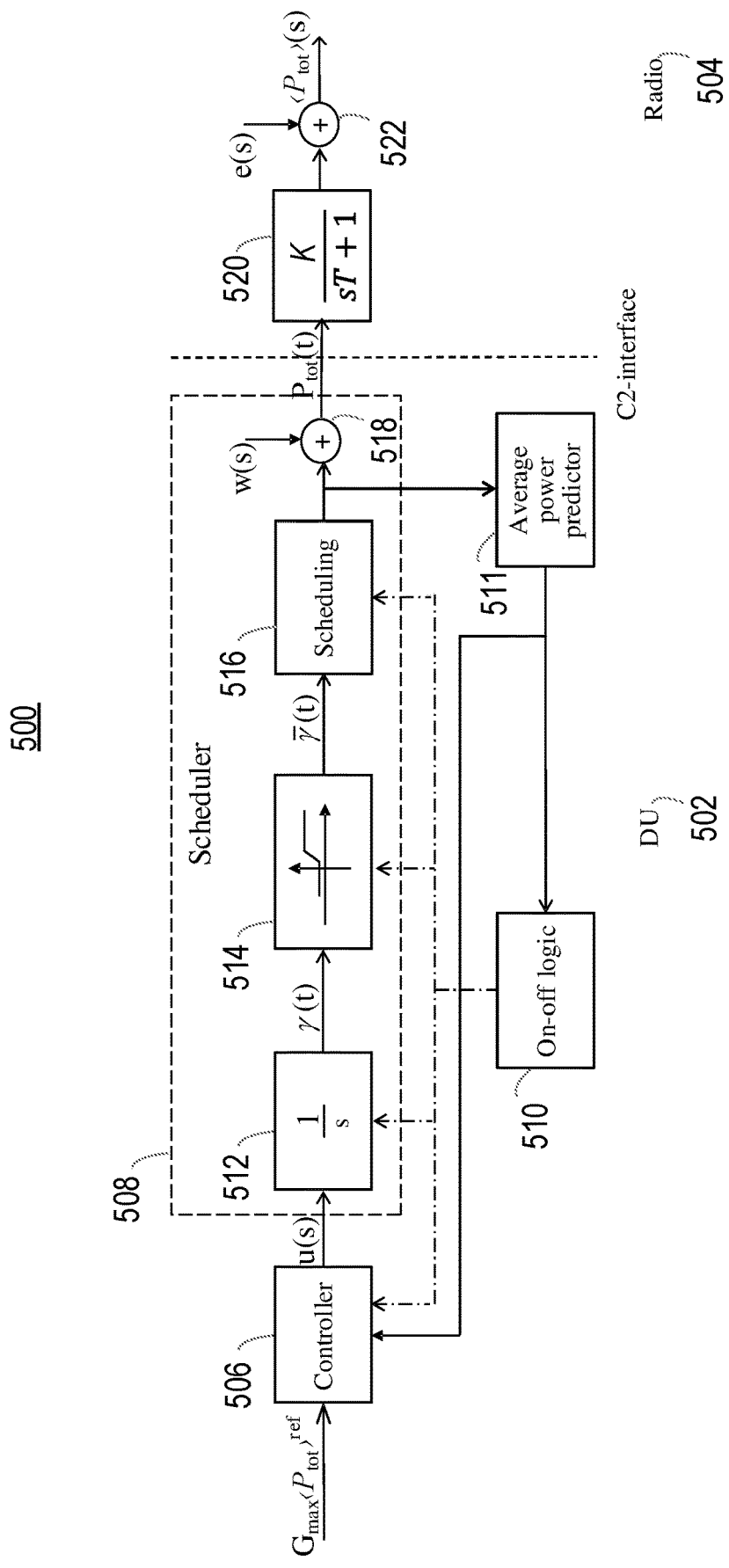
FIG. 5 shows a transmitter arrangement according to further embodiments of the disclosure.

FIG. 5 shows a transmitter arrangement 500 according to further embodiments of the disclosure.

The transmitter arrangement 500 is similar to the arrangement 400 described above with respect to FIG. 4, and therefore will not be described fully herein. However, rather than measuring the transmitter output power, the arrangement 500 predicts the transmitter output power based on an output of the scheduling algorithm 516. Thus the transmitter arrangement 500 additionally comprises an average power predictor 511 coupled to an output of the scheduling algorithm 516.

For example, the estimated output power may be obtained based on the fraction of radio resources (e.g., PRBs) in use at one time, and then averaging this quantity over a period of time. Thus the momentary scheduled power as estimated by the fraction of PRBs used at each time instant may be summed over the time T, and then divided by the time T to obtain the average.

This predicted value is then provided to the on/off logic 510 for the purposes of enabling and disabling the control mechanism, and to the controller 506 for comparison to the output power reference value.

Figure 6:
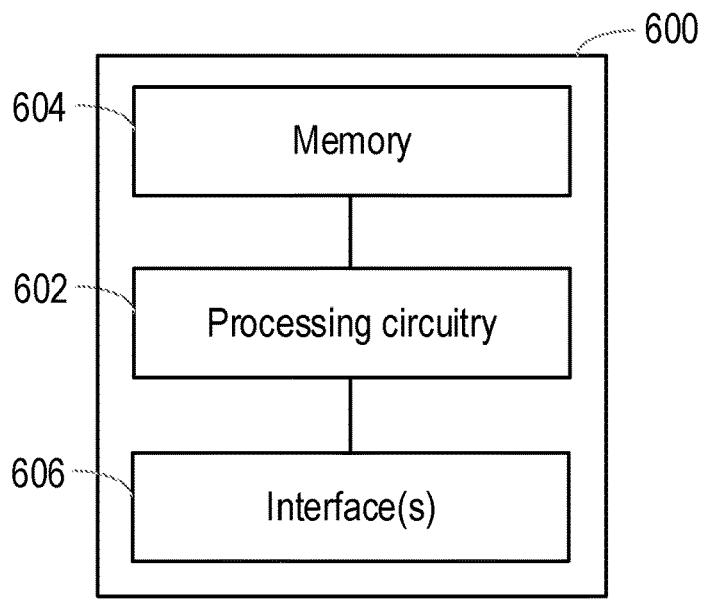
FIG. 6 is a schematic diagram of a network node according to embodiments of the disclosure.

FIG. 6 is a schematic diagram of a network node 600 according to embodiments of the disclosure. The network node 600 may be configured to implement the method described above with respect to FIG. 3, for example. The network node 600 may comprise or be implemented in a radio access node (such as the radio access node 112) of a wireless communications network. Alternatively, the network node 600 may comprise or be implemented in a scheduler communicatively coupled to such a radio access network.

The network node 600 comprises processing circuitry (such as one or more processors) 602 and a non-transitory machine-readable medium 604 (such as memory). The memory may store instructions which, when executed by the processing circuitry 602, cause the network node to: determine an average output power of a transmission point over a period of time; compare the average output power to an output power reference value; and allocate data, to be transmitted by the transmission point to one or more wireless devices, to a pool of radio resources. The pool of radio resources is adjusted as a function of the comparison between the average output power and the output power reference value. The output power reference value varies as a function of a maximum antenna gain of an antenna array of the transmission point during the period of time.

The network node 600 may further comprise one or more interfaces 606, for transmitting signals to and/or receiving signals from other network nodes of the wireless communications network. The interfaces 606 may comprise circuitry for the transmission and/or reception of electrical, optical or wireless signals.

The interface(s) 606, processing circuitry 602 and machine-readable medium 602 may be connected together in any suitable manner. In the illustrated embodiment, the components are coupled together directly, in series. In alternative embodiments, the components may be coupled to each other via a system bus or other communication line.

Figure 7:
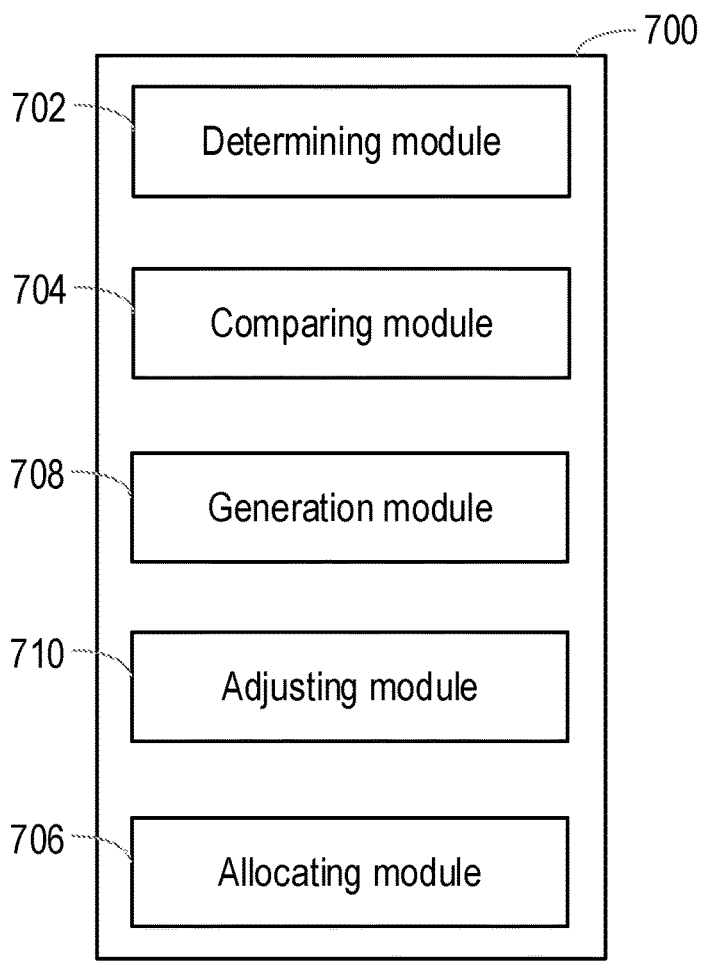
FIG. 7 is a schematic diagram of a network node according to further embodiments of the disclosure.

FIG. 7 is a schematic diagram of a network node 700 according to further embodiments of the disclosure.

The network node 700 may be configured to implement the method described above with respect to FIG. 3, for example. The network node 700 may comprise or be implemented in a radio access node (such as the radio access node 112) of a wireless communications network. Alternatively, the network node 700 may comprise or be implemented in a scheduler communicatively coupled to such a radio access network.

The network node 700 comprises a determining module 702, a comparing module 704 and an allocating module 706. In one embodiment, the determining module 702 may be configured to determine an average output power of a transmission point over a period of time. The comparing module 704 may be configured to compare the average output power to an output power reference value. The allocating module 706 may be configured to allocate data, to be transmitted by the transmission point to one or more wireless devices, to a pool of radio resources. The pool of radio resources is adjusted as a function of the comparison between the average output power and the output power reference value. The output power reference value varies as a function of a maximum antenna gain of an antenna array of the transmission point during the period of time.

In the illustrated embodiment, the network node additionally comprises a generation module 708 and an adjusting module 710. The generation module 708 may be configured to generate a control signal based on the output of the comparing module 704. The adjusting module 710 may be configured to adjust the pool of radio resources based on the control signal.

The network node 700 may further comprise one or more interface modules, for transmitting signals to and/or receiving signals from other network nodes of the wireless communications network. The interface modules may comprise circuitry for the transmission and/or reception of electrical, optical or wireless signals.

In one embodiment, the modules of the network node 700 are implemented purely in software. In another embodiment, the modules of the network node 700 are implemented purely in hardware. In a further embodiment, the modules of the network 700 are implemented in a combination of hardware and software.

Thus the disclosure provides methods, apparatus and machine-readable mediums for controlling the transmit output power of a transmission point. In particular, the disclosure provides a mechanism for smoothly varying the transmit output power so that the time-averaged value is below a threshold that has been pre-determined to comply with a regulatory RF exposure requirement.

It should be noted that the above-mentioned embodiments illustrate rather than limit the concepts disclosed herein, and that those skilled in the art will be able to design many alternative embodiments without departing from the scope of the appended following statements and claims. The word "comprising" does not exclude the presence of elements or steps other than those listed in a statement or claim, "a" or "an" does not exclude a plurality, and a single processor or other unit may fulfil the functions of several units recited in the statements and claims. Any reference signs in the statements shall not be construed so as to limit their scope.

The following numbered paragraphs set out embodiments of the disclosure:

1. A method for controlling the output of a transmission point for a wireless communications network, the method comprising:
    determining an average output power of the transmission point over a period of time;
    comparing the average output power to an output power reference value; and
    allocating data, to be transmitted by the transmission point to one or more wireless devices, to a pool of radio resources,
    wherein the pool of radio resources is adjusted as a function of the comparison between the average output power and the output power reference value, and
    wherein the output power reference value varies as a function of a maximum antenna gain of an antenna array of the transmission point during the period of time.

2. The method according to embodiment 1, wherein the maximum antenna gain is calculated based on a transmit correlation matrix used by the transmission point for transmissions during the period of time.

3. The method according to embodiment 2, wherein the maximum antenna gain is calculated based on an average of the transmit correlation matrix over the period of time.

4. The method according to embodiment 2 or 3, wherein the transmit correlation matrix is representative of a correlation between signals provided to antenna elements of an antenna array of the transmission point.

5. The method according to embodiment 4, wherein the transmit correlation matrix is estimated based on a sum of transmitted frequency-domain signals from the antenna elements.

6. The method according to embodiment 5, wherein the transmitted frequency-domain signals are summed over a set of resource elements available to the transmission point for transmissions.

7. The method according to embodiment 6, wherein the set of resource elements comprises:
- all resource elements available to the transmission point for transmissions; or
- a subset of all resource elements available to the transmission point for transmissions.

8. The method according to any one of embodiments 2 to 7, wherein the transmit correlation matrix based on a total output power of the antenna array over the period of time.

9. The method according to any one of the preceding embodiments, wherein the maximum antenna gain based on a set of steering vectors.

10. The method according to embodiment 9 when dependent on any one of embodiments 2 to 8, wherein the maximum antenna gain $G_{max}(t)$ is calculated as $$G_{max}(t) = \mathrm{argmax}_{a \in A}(a^H \tilde{R}(t) a),$$

wherein A is the set of steering vectors a, and wherein $\tilde{R}(t)$ is the transmit correlation matrix.

11. The method according to any one of the preceding embodiments, wherein the pool of radio resources is a fraction of a total pool of available radio resources, and wherein the fraction varies as a function of the comparison between the average output power and the output power reference value.

12. The method according to any one of the preceding embodiments, wherein the pool of radio resources comprises resources at a plurality of different transmission frequencies.

13. The method according to any one of the preceding embodiments, further comprising:
- generating a control signal based on the comparison between the average output power and the output power reference value, and adjusting the pool of radio resources based on the control signal.

14. The method according to embodiment 13, wherein the controller that generates the control signal implements a proportional—derivative control scheme.

15. The method according to embodiment 14, wherein the control signal comprises a first term which is proportional to a difference between the average output power and the output power reference value.

16. The method according to embodiment 14 or 15, wherein the control signal comprises a second term which is proportional to a time-derivative of the average output power.

17. The method according to embodiment 16, wherein the second term is restricted to values which are equal to or less than zero.

18. The method according to any one of the preceding embodiments, wherein the pool of resources is set to a minimum value responsive to a determination that the average output power is within a proportional threshold of the output power maximum value.

19. The method according to any one of the preceding embodiments, wherein determining an average output power of the transmission point over a period of time comprises measuring amplitudes of one or more radio signals provided to one of more antenna elements of the transmission point.

20. The method according to any one of embodiments 1 to 18, wherein determining an average output power of the transmission point over a period of time comprises predicting an average output power of the transmission point over a period of time.

21. The method according to any one of the preceding embodiments, further comprising disabling adjustments to the pool of resources responsive to a determination that the average output power is below a first threshold value.

22. The method according to any one of the preceding embodiments, further comprising enabling adjustments to the pool of resources responsive to a determination that the average output power is above a second threshold value.

23. The method according to embodiment 22 when dependent on embodiment 21, wherein the second threshold value is greater than the first threshold value.

24. A network node configured to perform the method according to any one of the preceding embodiments.

25. A network node for the output of a transmission point for a wireless communications network, the network node comprising processing circuitry and a non-transitory machine-readable medium storing instructions which, when executed by the processing circuitry, cause the network node to:
- determine an average output power of the transmission point over a period of time;
- compare the average output power to an output power reference value; and
- allocate data, to be transmitted by the transmission point to one or more wireless devices, to a pool of radio resources,
- wherein the pool of radio resources is adjusted as a function of the comparison between the average output power and the output power reference value, and
- wherein the output power reference value varies as a function of a maximum antenna gain of an antenna array of the transmission point during the period of time.

26. The network node according to embodiment 25, wherein the maximum antenna gain based on a transmit correlation matrix used by the transmission point for transmissions during the period of time.

27. The network node according to embodiment 26, wherein the maximum antenna gain based on an average of the transmit correlation matrix over the period of time.

28. The network node according to embodiment 26 or 27, wherein the transmit correlation matrix is representative of a correlation between signals provided to antenna elements of an antenna array of the transmission point.

29. The network node according to embodiment 28, wherein the transmit correlation matrix based on a sum of transmitted frequency-domain signals from the antenna elements.

30. The network node according to embodiment 29, wherein the transmitted frequency-domain signals are summed over a set of resource elements available to the transmission point for transmissions.

31. The network node according to embodiment 30, wherein the set of resource elements comprises:
- all resource elements available to the transmission point for transmissions; or
- a subset of all resource elements available to the transmission point for transmissions.

32. The network node according to any one of embodiments 26 to 31, wherein the transmit correlation matrix based on a total output power of the antenna array over the period of time.

33. The network node according to any one of embodiments 25 to 32, wherein the maximum antenna gain based on a set of steering vectors.

34. The network node according to embodiment 33 when dependent on any one of embodiments 26 to 32, wherein the maximum antenna gain $G_{max}(t)$ is calculated as $$G_{max}(t) = \mathrm{argmax}_{a \in A}(a^H \tilde{R}(t)a),$$

wherein A is the set of steering vectors a, and wherein $\tilde{R}(t)$ is the transmit correlation matrix.
35. The network node according to any one of embodiments 25 to 34, wherein the pool of radio resources is a fraction of a total pool of available radio resources, and wherein the fraction varies as a function of the comparison between the average output power and the output power reference value.
36. The network node according to any one of embodiments 25 to 35, wherein the pool of radio resources comprises resources at a plurality of different transmission frequencies.
37. The network node according to any one of embodiments 25 to 36, wherein the network node is further caused to:
generating a control signal based on the comparison between the average output power and the output power reference value, and adjusting the pool of radio resources based on the control signal.
38. The network node according to embodiment 37, wherein the controller that generates the control signal implements a proportional—derivative control scheme.
39. The network node according to embodiment 38, wherein the control signal comprises a first term which is proportional to a difference between the average output power and the output power reference value.
40. The network node according to embodiment 38 or 39, wherein the control signal comprises a second term which is proportional to a time-derivative of the average output power.
41. The network node according to embodiment 40, wherein the second term is restricted to values which are equal to or less than zero.
42. The network node according to any one of embodiments 25 to 41, wherein the pool of resources is set to a minimum value responsive to a determination that the average output power is within a proportional threshold of the output power maximum value.
43. The network node according to any one of embodiments 25 to 42, wherein determining an average output power of the transmission point over a period of time comprises measuring amplitudes of one or more radio signals provided to one of more antenna elements of the transmission point.
44. The network node according to any one of embodiments 25 to 42, wherein determining an average output power of the transmission point over a period of time comprises predicting an average output power of the transmission point over a period of time.
45. The network node according to any one of embodiments 25 to 44, wherein the network node is further caused to disable adjustments to the pool of resources responsive to a determination that the average output power is below a first threshold value.
46. The network node according to any one of embodiments 25 to 45, wherein the network node is further caused to enable adjustments to the pool of resources responsive to a determination that the average output power is above a second threshold value.
47. The network node according to embodiment 46 when dependent on embodiment 45, wherein the second threshold value is greater than the first threshold value.
48. A network node for the output of a transmission point for a wireless communications network, the network node comprising:
a determining module configured to determine an average output power of the transmission point over a period of time;
a comparing module configured to compare the average output power to an output power reference value; and
an allocation module configured to allocate data, to be transmitted by the transmission point to one or more wireless devices, to a pool of radio resources,
wherein the pool of radio resources is adjusted as a function of the comparison between the average output power and the output power reference value, and
wherein the output power reference value varies as a function of a maximum antenna gain of an antenna array of the transmission point during the period of time.
49. The network node according to embodiment 48, wherein the maximum antenna gain based on a transmit correlation matrix used by the transmission point for transmissions during the period of time.
50. The network node according to embodiment 49, wherein the maximum antenna gain based on an average of the transmit correlation matrix over the period of time.
51. The network node according to embodiment 49 or 50, wherein the transmit correlation matrix is representative of a correlation between signals provided to antenna elements of an antenna array of the transmission point.
52. The network node according to embodiment 51, wherein the transmit correlation matrix based on a sum of transmitted frequency-domain signals from the antenna elements.
53. The network node according to embodiment 52, wherein the transmitted frequency-domain signals are summed over a set of resource elements available to the transmission point for transmissions.
54. The network node according to embodiment 53, wherein the set of resource elements comprises:
all resource elements available to the transmission point for transmissions; or
a subset of all resource elements available to the transmission point for transmissions.
55. The network node according to any one of embodiments 49 to 54, wherein the transmit correlation matrix based on a total output power of the antenna array over the period of time.
56. The network node according to any one of embodiments 48 to 55, wherein the maximum antenna gain based on a set of steering vectors.
57. The network node according to embodiment 56 when dependent on any one of embodiments 49 to 55, wherein the maximum antenna gain $G_{max}(t)$ is calculated as $$G_{max}(t) = \mathrm{argmax}_{a \in A}(a^H \tilde{R}(t)a),$$

wherein A is the set of steering vectors a, and wherein kW is the transmit correlation matrix.
58. The network node according to any one of embodiments 48 to 57, wherein the pool of radio resources is a fraction of a total pool of available radio resources, and wherein the fraction varies as a function of the comparison between the average output power and the output power reference value.
59. The network node according to any one of embodiments 48 to 58, wherein the pool of radio resources comprises resources at a plurality of different transmission frequencies.
60. The network node according to any one of embodiments 48 to 59, further comprising:
a generating module configured to generate a control signal based on the comparison between the average output power and the output power reference value; and an adjusting module configured to adjust the pool of radio resources based on the control signal.

61. The network node according to embodiment 60, wherein the generating module implements a proportional—derivative control scheme.

62. The network node according to embodiment 61, wherein the control signal comprises a first term which is proportional to a difference between the average output power and the output power reference value.

63. The network node according to embodiment 61 or 62, wherein the control signal comprises a second term which is proportional to a time-derivative of the average output power.

64. The network node according to embodiment 63, wherein the second term is restricted to values which are equal to or less than zero.

65. The network node according to any one of embodiments 48 to 64, wherein the pool of resources is set to a minimum value responsive to a determination that the average output power is within a proportional threshold of the output power maximum value.

66. The network node according to any one of embodiments 48 to 65, wherein determining an average output power of the transmission point over a period of time comprises measuring amplitudes of one or more radio signals provided to one of more antenna elements of the transmission point.

67. The network node according to any one of embodiments 48 to 65, wherein determining an average output power of the transmission point over a period of time comprises predicting an average output power of the transmission point over a period of time.

68. The network node according to any one of embodiments 48 to 67, further comprising a disabling module configured to disable adjustments to the pool of resources responsive to a determination that the average output power is below a first threshold value.

69. The network node according to any one of embodiments 48 to 68, further comprising an enabling module configured to enable adjustments to the pool of resources responsive to a determination that the average output power is above a second threshold value.

70. The network node according to embodiment 69 when dependent on embodiment 68, wherein the second threshold value is greater than the first threshold value.

71. A computer program for performing the method according to any one of embodiments 1 to 23.

72. A computer program product, comprising a computer program according to embodiment 71.

73. A computer program product according to embodiment 72, embodied on a carrier.

APPENDIX

The following subsection explains the basics of the terminology used. It is stressed that this terminology is part of the prior art in the field of automatic control. A number of representations of a dynamic process may be introduced. A dynamic process is one where the output depends not only on the present input signal but also on previous inputs and outputs. In other words, the dynamic process has memory. The most basic dynamic process is the linear one that can be described by a differential equation as $$y^{(n)}(t)+a_1y^{(n-1)}(t)+\ldots+a_ny(t)=b_0u^{(m)}(t)+\ldots b_mu(t).$$

Here y(t) is the output signal, u(t) is the input signal, t, is the time, while $a_i$, $i=1,\ldots,n$ and $b_j$, $j=0,\ldots,m$ are constant parameters. The superscript $^{(i)}$ denotes differentiation with respect to time i times. The above differential equation has order n. It has one input signal and one output signal. For simplicity all concepts are explained in this context, but those skilled in the art will appreciate that the concepts can be generalized to more than one input signal and/or more than one output signal.

By taking Laplace transforms and setting initial values to zero, the differential equation is transformed to be represented by a transfer function H(s), where s denotes the Laplace transform variable, which is closely related to the angular frequency used in Fourier transforms. The result is $$H(s) = \frac{B(s)}{A(s)} = \frac{b_0 s^m + b_1 s^{m-1} + \ldots + b_m}{s^n + a_1 s^{n-1} + \ldots + a_n}.$$

The relationship between the output signal Laplace transform Y(s) and the input signal Laplace transform U(s) is $$Y(s)=H(s)U(s)$$

The poles $p_i$ (where $i=1,\ldots,n$) of the process are given by the equation A(s)=0. For simplicity only strictly stable (open loop) processes with all poles in the left complex half plane are considered here. In general, poles can be real or complex conjugate pairs.

The properties of the dynamic process can also be studied in the frequency domain in terms of complex-valued frequency functions Y(jω), H(jω) and U(jω). ω denotes the angular frequency that fulfils $$\omega = 2\pi f,$$

where f is the frequency in Hz. References to frequency hereinafter are to be understood as references to angular frequency.

Figure 8:
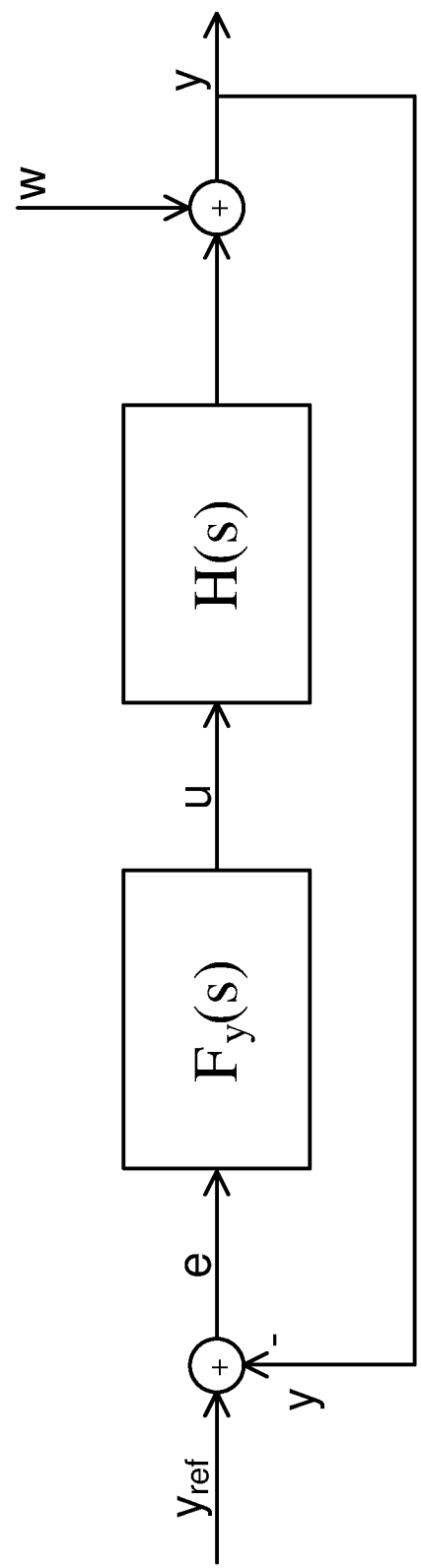
FIG. 8 is a block diagram of an automatic control scheme.

The following definition is best explained with respect to FIG. 8, where $F_y(s)$ is the feedback gain. The closed loop system is then computed as follows $$Y(s)=W(s)+H(s)F_y(s)(Y_{ref}(s)-Y(s)),$$

which gives $$Y(s) = \frac{F_y(s)H(s)}{1+F_y(s)H(s)} Y_{ref}(s) + \frac{1}{1+F_y(s)H(s)} W(s).$$

This gives the effect of the reference signal and the disturbance on the output. The remaining definitions now follow:

The closed loop bandwidth $\omega_{CL}$ of the control system is given by the equation $$\left|\frac{F_y(j\omega_{CL})H(j\omega_{CL})}{1+F_y(j\omega_{CL})H(j\omega_{CL})}\right|^2 = \frac{1}{2}\left|\frac{F_y(0)H(0)}{1+F_y(0)H(0)}\right|^2.$$

The closed loop static error of the control system is given by the equation $$y_{ref} - y = \frac{1}{1+F_y(0)H(0)}(y_{ref} - w),$$

The static disturbance rejection of the control system is given by the static sensitivity function $$S(0) = \frac{1}{1 + F_y(0)H(0)}.$$

The dynamic disturbance rejection of the control system is determined by the sensitivity function $$S(j\omega) = \frac{1}{1 + F_y(j\omega)H(j\omega)}$$

The complimentary sensitivity function of the control system, $T(j\omega)=1-S(j\omega)$ determines the robustness of the control system with respect to un-modelled dynamics.

Reciprocity-Assisted Transmission

Channel reciprocity is a consequence of Maxwell's equations. Given two nodes equipped with antenna arrays that communicate in a single frequency band, the channel reciprocity property means that at any given point in time, the complex channel coefficient between any transmitting antenna element in one node and any receiving antenna element in the other node, is the same (to within a transpose) in the uplink and the downlink. The channel matrix hence remains essentially the same between the antenna arrays of the two nodes when the direction of the transmission is reversed. The two nodes may typically be a user equipment (UE), i.e. a mobile device and an eNB (or gNB in 5G). It should be noted that the time is assumed to be (almost) the same for the two directions of transmission.

To exploit reciprocity, the channel coefficients can be directly estimated by the base station from UE uplink transmission of known pilot signals, for example so called sounding reference signals (SRSs). These signals are available in both the 4G and 5G standards. The estimated channel can then be used to compute the combining weight matrix with a selected principle, and then used for downlink transmission. This works since the uplink and downlink channels are the same (to within a transpose) when reciprocity is valid.

A very simple MU-MIMO scheme is so called Zero-Forcing (ZF) transmission. This scheme is sensitive and structurally limited since the number of antenna elements in the transmitter and receiver needs to be equal. It is however very straightforward and easy to compute. The beamforming weights W are then obtained from the estimated quadratic channel matrix H from the condition that the received signal vector s should equal the transmitted one x, i.e.

$$s = HWx = x, \forall x \Leftrightarrow W = H^{-1}$$

This choice thus makes the received data streams orthogonal in theory, provided that H is square and invertible.

For so called Reciprocity Assisted Transmission (RAT) the transmission scheme can be obtained by criterion minimization. In this case it is not needed that the estimated channel matrix $\hat{H}$ is a square matrix.

The standard RAT criterion to be minimized is then $$\hat{W} = \arg\min_W \|\hat{H}W - H^{ref}\|_{fro}^2$$

$$= \arg\min_W \|(\hat{H} + \tilde{H})W - H^{ref}\|_{fro}^2$$

$$= \arg\min_W tr\left((\hat{H}W + H^{ref})(\hat{H}^{DL}W - H^{ref})^H + W^H \hat{\Gamma} W\right),$$

where $\hat{\Gamma}$ is the estimate of the covariance matrix of $\tilde{H}^{DL}$, and where it is assumed that $\hat{H}$ and $\tilde{H}$ are un-correlated. The minimizer of the criterion can be analytically computed as $$\hat{W} = ((\hat{H})^H \hat{H} + \hat{\Gamma})^{-1} (\hat{H})^H H^{ref}.$$

Here $H^{ref}$ is the desired channel matrix after the beamforming computations and the subscript $_{fro}$ denotes the use of the Frobenius norm.

The invention claimed is:

1. A method for controlling the output of a transmission point for a wireless communications network, the method comprising:
    determining an average output power of the transmission point over a period of time;
    comparing the average output power to an output power reference value; and
    allocating data, to be transmitted by the transmission point to one or more wireless devices, to a pool of radio resources,
    wherein the pool of radio resources is adjusted as a function of the comparison between the average output power and the output power reference value, and
    wherein the output power reference value varies as a function of a maximum antenna gain of an antenna array of the transmission point during the period of time.

2. The method according to claim 1, further comprising: calculating the maximum antenna gain based on a transmit correlation matrix used by the transmission point for transmissions during the period of time.

3. The method according to claim 2, further comprising: calculating the maximum antenna gain based on an average of the transmit correlation matrix over the period of time.

4. The method according to claim 2, wherein the transmit correlation matrix is representative of a correlation between signals provided to antenna elements of an antenna array of the transmission point.

5. The method according to claim 4, further comprising: estimating the transmit correlation matrix based on a sum of transmitted frequency-domain signals from the antenna elements.

6. The method according to claim 5, further comprising: summing the transmitted frequency-domain signals over a set of resource elements available to the transmission point for transmissions.

7. The method according to claim 6, wherein the set of resource elements comprises:
    all resource elements available to the transmission point for transmissions; or
    a subset of all resource elements available to the transmission point for transmissions.

8. The method according to claim 2, further comprising: further estimating the transmit correlation matrix based on a total output power of the antenna array over the period of time.

9. The method according to claim 2, further comprising: calculating the maximum antenna gain $G_{max}(t)$ as $$G_{max}(t) = \arg\max_{a \in A}(a^H \tilde{R}(t) a),$$

wherein A is a set of steering vectors a, and wherein $\tilde{R}(t)$ is the transmit correlation matrix.

10. The method according to claim 1, further comprising: calculating the maximum antenna gain based on a set of steering vectors.

11. The method according to claim 1, further comprising: determining the pool of radio resources to be a fraction of a total pool of available radio resources, where the fraction varies as a function of the comparison between the average output power and the output power reference value, wherein the pool of radio resources comprises resources at a plurality of different transmission frequencies.

12. The method according to claim 1, further comprising: generating a control signal based on the comparison between the average output power and the output power reference value, and adjusting the pool of radio resources based on the control signal.

13. A network node for controlling an output of a transmission point for a wireless communications network, the network node comprising:
   a non-transitory machine-readable medium to store a scheduler; and
   processing circuitry to execute the scheduler, the scheduler to determine an average output power of the transmission point over a period of time; compare the average output power to an output power reference value; and allocate data, to be transmitted by the transmission point to one or more wireless devices, to a pool of radio resources, wherein the pool of radio resources is adjusted as a function of the comparison between the average output power and the output power reference value, and wherein the output power reference value varies as a function of a maximum antenna gain of an antenna array of the transmission point during the period of time.

14. The network node according to claim 13, wherein the processing circuitry is adapted to calculate the maximum antenna gain based on a transmit correlation matrix used by the transmission point for transmissions during the period of time.

15. The network node according to claim 14, wherein the processing circuitry is adapted to calculate the maximum antenna gain based on an average of the transmit correlation matrix over the period of time.

16. The network node according to claim 15, wherein the transmit correlation matrix is representative of a correlation between signals provided to antenna elements of an antenna array of the transmission point.

17. The network node according to claim 14, wherein the transmit correlation matrix is representative of a correlation between signals provided to antenna elements of an antenna array of the transmission point.

18. A non-transitory machine-readable medium having stored therein a set of instructions, which when executed by a computing device cause the computing device to perform operations comprising:
   determining an average output power of a transmission point over a period of time;
   comparing the average output power to an output power reference value; and
   allocating data, to be transmitted by the transmission point to one or more wireless devices, to a pool of radio resources,
   wherein the pool of radio resources is adjusted as a function of the comparison between the average output power and the output power reference value, and
   wherein the output power reference value varies as a function of a maximum antenna gain of an antenna array of the transmission point during the period of time.

19. The non-transitory machine-readable medium according to claim 18, wherein the operations further comprise:
   calculating the maximum antenna gain based on a transmit correlation matrix used by the transmission point for transmissions during the period of time.

20. The non-transitory machine-readable medium of claim 19, wherein the operations further comprise:
   calculation the maximum antenna gain based on an average of the transmit correlation matrix over the period of time.

21. The non-transitory machine-readable medium of claim 19, wherein the transmit correlation matrix is representative of a correlation between signals provided to antenna elements of an antenna array of the transmission point.

* * * * *